March 2, 1943.  E. C. VOLLRATH  2,312,607
WINDOW REGULATOR
Filed Sept. 11, 1940

INVENTOR.
EDWIN C. VOLLRATH
BY Carl J. Barbee
His Attorney

Patented Mar. 2, 1943

2,312,607

UNITED STATES PATENT OFFICE 2,312,607

WINDOW REGULATOR

Edwin C. Vollrath, Wauwatosa, Wis., assignor to Nash-Kelvinator Corporation, Kenosha, Wis., a corporation of Maryland Application September 11, 1940, Serial No. 356,242

3 Claims. (Cl. 268—97)

This invention relates to window operating mechanism and has particular reference to mechanism for moving an automobile window in the plane of the window glass.

It is an object of this invention to provide mechanism for moving a window glass in the plane of the glass by means of an operating handle positioned adjacent to the window.

It is another object of this invention to provide window opening mechanism in which a single lever is operable to lock the window in any one of a plurality of positions, and to move the window by reciprocating the lever.

It is another object of this invention to provide window opening mechanism which will be inexpensive and easy to install.

It is another object of this invention to provide window opening mechanism for an automobile which may be positioned out of the way of passengers in the automobile.

Other objects and advantages of this invention will be apparent from the following description and claims and the attached drawing of which there is one sheet and in which—

Figure 1:
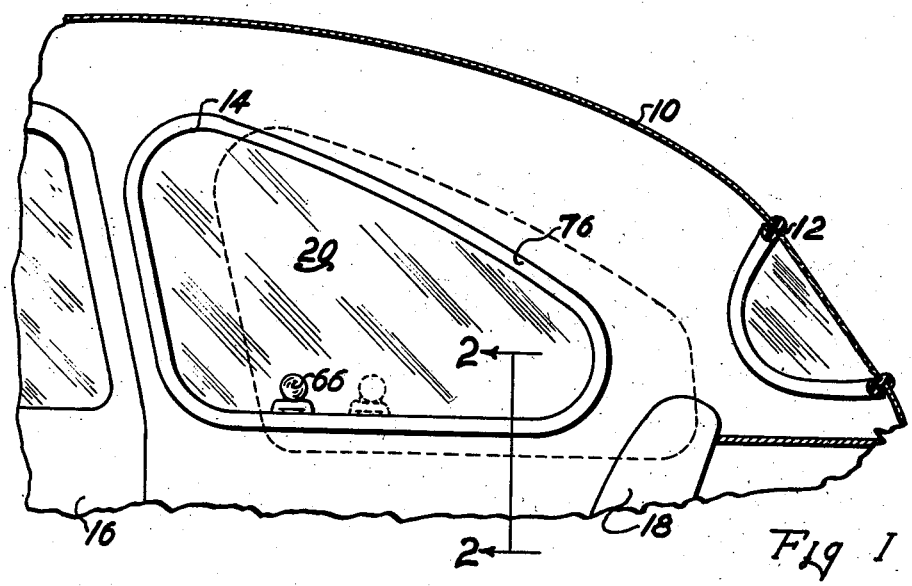
Figure 1 represents a vertical, longitudinal section through the rear portion of an automobile.

The mechanism illustrated in the drawings is particularly adapted to move an automobile window along a generally horizontal line in the plane of the window. The mechanism is designed especially for opening and closing the rear quarter window of an automobile to provide an opening along the forward vertical edge of the window. However, the mechanism may obviously be employed on other than the rear quarter window and may also be employed to move the window vertically.

Shown in the drawing is a closed automobile having a top 10 which is carried downwardly along the back and sides of the automobile and defines the rear window opening 12 and a side or rear quarter window opening 14. The rear quarter window opening 14 is positioned just behind the door 16 and just ahead of the rear seat 18. The window opening 14 is closed by a window pane 20 which is arranged to slide in a vertical longitudinal plane to provide an opening along the forward edge of the pane as is indicated by the dotted lines in Figure 1.

Figure 2:
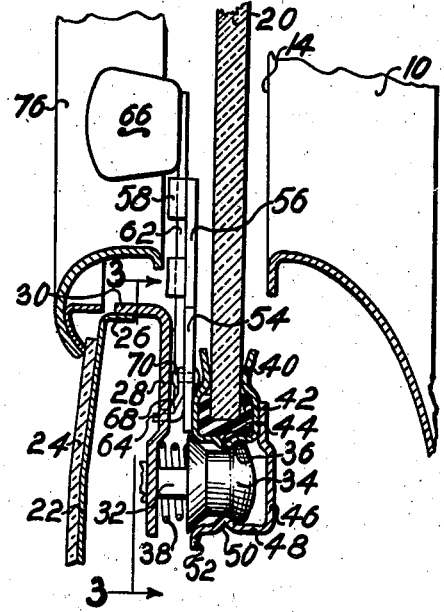
Figure 2 represents a section taken along a plane indicated by the line 2—2 in Figure 1 and looking in the direction of the arrows.

As is most clearly illustrated in Figure 2, the bottom edge of the window opening 14 is adjacent to the top edge of an inner body panel 22 which is covered on the inside by the upholstery 24. The top of the panel 22 is flanged outwardly as at 26 and supports a carrier rail 28 which is flanged inwardly at 30 and welded on top of the flange 26. The carrier rail 28 supports a series of short shafts 32 along its lower edge. The shafts 32 serve to journal a series of rollers 34 which are flanged to provide a central annular groove 36 therearound. Coil springs 38 are positioned between the outer edge of the rail 28 on the inside of the rollers 34 to keep the rollers from sliding inwardly against the rail.

The lower edge of the window pane 20 is rigidly received in a generally U-shaped channel member 40 which is filled with rubber or some other flexible bonding material 42 to retain the glass. The bottom of the channel member 40 is provided with a downwardly extending rib 44, which rib is arranged to ride within the groove 36 in the wheels 34.

Secured to the outer side of the channel member 40, as by welding, is a movable rail member 46 which is provided with an inwardly facing flange 48 along the lower edge thereof. The center of the flange 48 is pressed upwardly in a rib 50 which rides in the central groove 36 of the rollers 34, and the inner edge of the flange 48 is turned downwardly as at 52 and is arranged to engage the inner flange of the wheels 34. It is thus apparent that the window glass 20 is supported on the rollers 34 by the channel member 40 and is held against upward movement by the flange 48 of the movable rail 46 which rides underneath the rollers 34.

Figure 4:
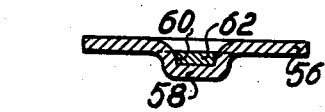
Figure 4 represents a section taken along a plane indicated by the line 4—4 in Figure 3 and looking in the direction of the arrows.
Figure 3:
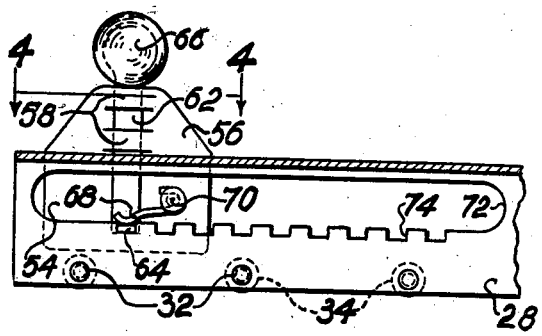
Figure 3 represents a section taken along a plane indicated by the line 3—3 in Figure 2 and looking in the direction of the arrows.

Secured to the inside flange of the channel member 40, as by welding thereto, and toward the forward end of the channel member 40 is an arm 54. The arm 54 is generally rectangular and is provided with a tapered upper end 56 which projects above the supporting rail 28 (see Figure 3). The tapered upper end 56 has two horizontal bands 58 which are stamped inwardly from the plane of the arm 54 to form a vertical guide slot 60 (see Figure 4). The slot 60 receives a vertical pin 62 which extends downwardly along the inside surface of the arm 54 and is provided at its lower end with an inwardly bent finger 64. The pin 62 extends above the tapered end 56 of the arm 54 and is provided with an operating knob 66. The pin 62 and knob 66 are constantly urged downwardly by a spring 68 which has one end secured to the arm 54 by a rivet 70 and has its free end bearing against the finger 64.

The support rail 28 is provided with a horizontal slot 72 (see Figure 3), the bottom edge of which is provided with a series of notches 74. The length of the shafts 32 is so arranged that the finger 64 on the pin 62 projects inwardly through the slot 72 in the support rail 28, and the spring 68 serves to urge the pin 62 and finger 64 downwardly into the notches 74 to lock the channel member 40 with respect to the support rail 28.

The upper edge of the body panel 22 and the support rail 28 are concealed by the garnish molding 76 in the usual manner.

In operation, the weight of the window glass 20 is supported through the rubber packing 42 and channel member 40 upon the rollers 34, and the window is held against movement by the engagement of the finger 64 in one of the notches 74. When it is desired to move the window, the operator raises the finger 64 out of the notches 74 by lifting up on knob 66 and then either pulls or pushes the knob 66 in a horizontal direction. The spaced bands 58 in the arm 54 serve to hold the pin 62 against rotation so that the horizontal movement of the knob 66 is imparted directly to the channel member 40 to move the window glass. The operating knob 66 is positioned close to the window glass and within the plane of the garnish molding 76 where there is no danger of the occupants of the car bumping against the lever or tearing clothing thereon. The various parts of the mechanism may be inexpensively formed and easily assembled.

While I have described my invention in some detail, I intend this description to be an example only and not as a limitation of my invention to which I make the following claims.

I claim:

1. Window operating mechanism comprising a support rail defining a horizontal slot, a glass receiving member movably supported by said support rail for longitudinal movement therealong, an arm secured to said glass receiving member, means carried on said arm defining a second slot normal to the axis of said first mentioned slot, a pin slidably mounted in said second slot, and a projection on said pin engageable in a plurality of positions with an edge of said first slot in said support rail, said pin being movable with respect to said arm only in a line normal to the line of movement of said glass receiving member, and spring means attached to said arm for urging said projection into engagement with said support rail.

2. In an automobile having a body panel adjacent to the lower edge of a window opening, a support rail supported by said body panel and defining a horizontal slot, a channel member supported by said rail for longitudinal movement with respect thereto, an arm secured to the side of said channel member, spaced bands bent from the plane of said arm and forming a guide slot, a pin positioned in said guide slot, a finger bent from the end of said pin and extending into the slot in said support rail, a spring carried by said arm for urging said finger into engagement with an edge of said slot, and a window glass secured to said channel member.

3. In an automobile having a body panel defining the lower edge of a window opening, a support rail supported by said body panel and defining a horizontal slot, a channel member supported by said rail for longitudinal movement with respect thereto, an arm secured to the side of said channel member, spaced bands bent from the plane of said arm and forming a guide slot, a pin positioned in said guide slot, a finger bent from the end of said pin and extending into the slot in said support rail, a spring carried by said arm for urging said finger into engagement with an edge of said slot, and a window glass secured to said channel member.

EDWIN C. VOLLRATH.